Jan. 16, 1945.    W. E. SILLICK    2,367,533
PROCESS FOR THE PREPARATION OF CELLULOSE NITRATE
Filed Jan. 23, 1941

WILLIAM E. SILLICK
*INVENTOR*
BY
*ATTORNEYS*

Patented Jan. 16, 1945

2,367,533

UNITED STATES PATENT OFFICE 2,367,533

PROCESS FOR THE PREPARATION OF CELLULOSE NITRATE

William E. Sillick, Rochester, N. Y., assignor to Eastman Kodak Company, Rochester, N. Y., a corporation of New Jersey Application January 23, 1941, Serial No. 375,650

7 Claims. (Cl. 260—223)

This invention relates to process and apparatus for the recovery and concentration of inorganic acids and more particularly to the separation and concentration of nitric and sulfuric acid mixtures obtained from cellulose nitration.

As is well known in the industry, large amounts of nitric acid, usually in conjunction with sulfuric acid are employed. These materials are thereafter obtained in the form of waste solutions and in order to reutilize the acids they must be recovered and concentrated.

In more detail, for example, in the nitration of cellulose at the end of the reaction time it is necessary to separate the mixture of nitric acid and sulfuric acid from nitrated cellulose. At the present time the method commonly practiced is centrifuging in a machine of a perforated basket type. This type of process will reduce the amount of acid remaining on the cellulose nitrate to, for example, the same weight as that of the cellulose nitrate. At that stage it has theretofore been considered necessary to quickly submerge the cellulose nitrate in water or some other liquid to prevent firing of the unstable product and to so dilute the acids remaining on the product that either nitration or denitration reactions stop.

The general practice is to submerge the solution in sufficient water that the suspension of cellulose nitrate in water which will flow by gravity through conduits, is formed. By such submerging in large quantities of water it is readily apparent that the acid value is substantially diluted to, for example, 3 percent acid. It is readily apparent that the removal of water from such low concentration acid by evaporation would require the expenditure of large quantities of heat and otherwise present substantial problems.

I have found an improved process and apparatus for carrying out the procedure whereby the acid not only may be separated and recovered as a relatively concentrated solution, for example, five to ten times as concentrated as heretofore obtainable in the prior art, but I have further found that the partially concentrated acid may be still further concentrated to substantially anhydrous acid as, for example, 95 percent nitric acid by my new method described herein.

This invention has for one object to provide a method for the separation and recovery in at least a partially concentrated condition of inorganic acids such as nitric and sulfuric acid. Another object is to provide a novel method of recovering inorganic acids from reaction materials whereby any injury to the reaction product is prevented. Still another object is to provide a method for the separation and recovery of waste nitration acids which is more efficient and satisfactory than prior art methods. Still another object is to provide a method whereby the recovered acid may be further concentrated. Another object is to provide novel apparatus for carrying out the aforedescribed processes. Still another object is to provide a novel apparatus wherein the steps may be conducted in a substantially continuous and an automatic manner. Other objects will appear hereinafter.

I have found that contrary to the prior art procedure, where extremely large amounts of water or other liquid were employed to submerge or douse the reaction materials with the resultant production of an extremely dilute acid liquor, this submerging step may be accomplished by means of an aqueous acidic solution by controlling the temperature of the solution and the length of contact time therewith, and other factors as will be described in further detail. I have further found that the recovered acids, which are already in a substantially stronger concentration than has hitherto been obtained, may be still further concentrated by a distillation procedure which includes reflux, as will be described in detail hereinafter.

For a more complete understanding of my invention reference is made to the attached drawing forming a part of the present application.

Figure 1:
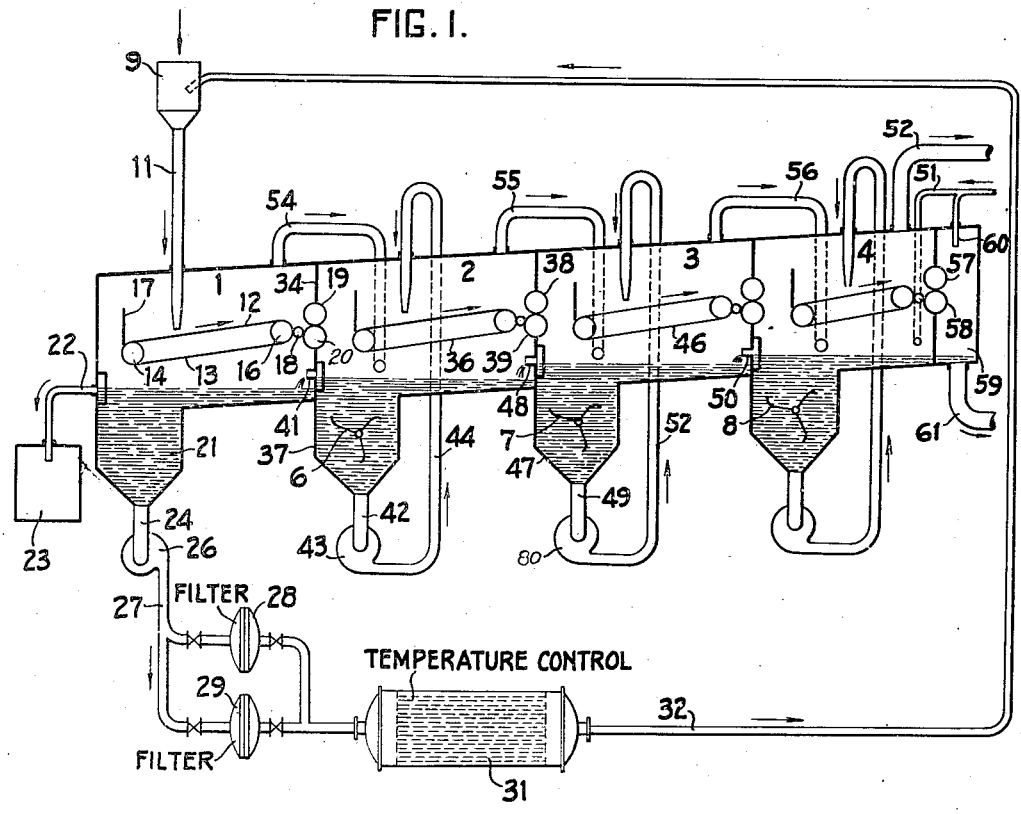
Figure 1 is a semi-diagrammatic side elevation view of one embodiment of a novel apparatus wherein my recovery and separation steps may be carried out. Certain parts have been shown broken away or on an exaggerated scale for clarity.

Referring now to Figure 1, my equipment may be considered as comprising four units in series, indicated as Nos. 1, 2, 3, and 4. These units would preferably be provided with one or more agitating means, designated as Nos. 6, 7, and 8, for accomplishing a thorough mixing of the solids involved in the process with the liquids in each unit.

Connected with the first unit of the series is the feed basin 9 which discharges through the feed conduit 11 into unit 1. Within unit 1 (as well as the other units) is provided a screen conveyor 12. This conveyor can be considered as comprising a flexible, endless, perforated belt 13 which rotates about the rollers or sprocket wheels 14 and 16. A baffle 17 is provided at one end of the screen conveyor and a plurality of idler and squeeze rolls 18, 19, and 20, provided at the other end of the screen conveyor.

Unit 1 is provided with a sump 21 which serves to collect the liquid from unit 1. At one point adjacent this sump may be provided a drawoff conduit 22 which discharges into the container 23. At a lower point on this sump is provided another conduit 24 which, for example, may feed through pump 26 to the recirculation system which may be considered as starting at conduit 27.

Conduit 27 may include in its circuit means for treating the liquid pumped therethrough as, for example, a plurality of filters 28 and 29 in parallel. A temperature controlling device is provided at 31. The discharge from unit 31 flows through conduit 32 back to the feed basin 8 already referred to. The exact construction of the filters and the temperature controlling device, which may merely comprise an ordinary tube bundle in the nature of a condenser or heat exchanger, is not a limitation upon this invention. Hence a detailed description is unnecessary. It is of course understood, for example, that the unit at 31 should have sufficient capacity to control the temperature of the liquids passing therethrough within the desired temperature ranges discussed hereinafter under an explanation of the operation of my novel process. The cooling medium may well be the water which will later be used to stabilize the nitrocellulose, and could be subsequently fed in at points 51 and 60.

The conveyor means 12 of unit 1 may be considered as discharging through rollers 19 and 20 into unit 2 which is separated therefrom by, for example, partition means 34. Unit 2 is of substantially identical construction as unit 1 which has just been described in that it includes a conveyor means 36, a sump 37 (preferably having positioned therein agitator means which has already been referred to) squeeze rollers 38 and 39, and otherwise being similar to unit 1 already described in detail. However, in the case of unit 2, as well as the other units in series therewith, the discharge orifice 41, rather than discharging into an external container, would discharge into unit 1. Another point of difference is that the withdrawal from sump 37 through conduit 42 and pump 43 is carried through conduit 44 back into unit 2 so as to spray or otherwise discharge onto conveyor 36.

Referring now to unit 3 this unit is likewise similar to the units described in that it includes a screen conveyor designated in its entirety as 46, a sump 47, overflow 48 and withdrawal means comprising conduit 49 through pump 80, and conduit 52 for discharging back to chamber 3 over conveyor 46.

In addition to unit 3 there could be placed still other units in series which would be of construction identical with unit 3. However, in the particular apparatus under consideration, wherein only four units in series have been described, the final unit, unit 4 in this instance, will now be considered. It is to be understood, however, that the exact number of units in series is not a limitation upon my invention but that, for example, the number may vary over wide limits as three units to ten or more. In general, between four and seven units have been found to be satisfactory.

Figure 2:
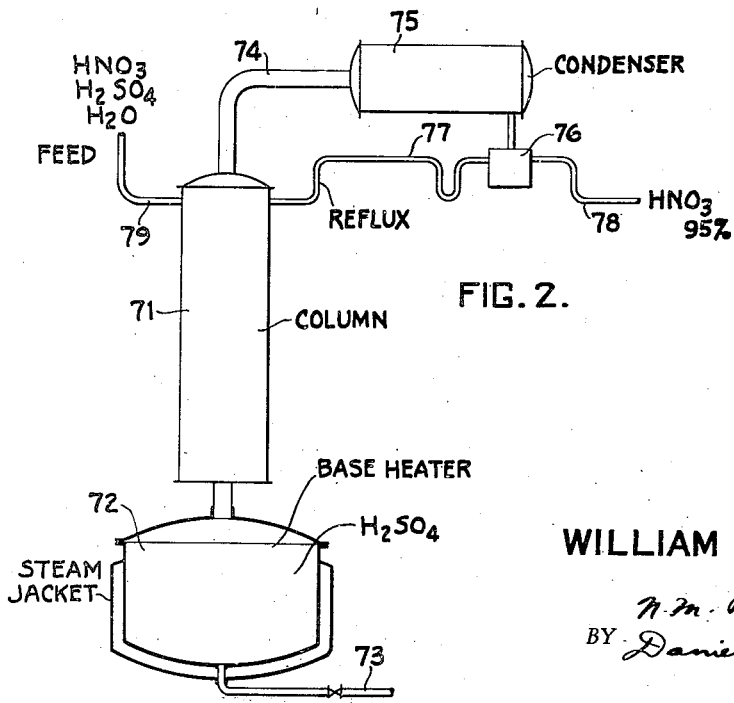
Figure 2 is likewise a semi-diagrammatic side elevation view of suitable apparatus which may be employed for carrying out certain of the acid concentration steps of my invention.

The last unit in the series, unit 4, is likewise substantially similar to the preceding units in many parts; hence, for conciseness only the parts wherein this unit differs will be referred to. Provision is made in unit 4 for the introduction of water at 51. Provision is made at 52 for a vapor takeoff conduit to which acid fumes and the like may be evacuated. At this point it may be mentioned that if desired similar exhaust conduits could be provided for each separate unit. As shown in Figure 2, the various units may be interconnected with conduits such as designated at 54, 55, and 56. In other words any suitable provision may be made for the exhaustion of fumes which may be present in the various units.

Unit 4 discharges through rollers 57 and 58 into the closed chamber 59. Provision is made at 60 for the introduction of water and at 61 for the withdrawal of the materials.

It will be observed that in Figure 1 the various units have been placed, not on the same level but each succeeding unit of the series at a slightly raised level. As is apparent from Figure 1, by such arrangement and, also, inclination of the screen conveyors, the liquid flow through the apparatus can be caused to take place by gravity. It is, of course, to be understood that if gravity flow were not desired or could not be arranged, the units could be placed on the same level and pumps be employed to cause the transfer of the liquid from one chamber to another. However, because of simplicity, gravity flow as shown in the drawing, is preferred.

It is understood that the apparatus, since it is in contact with acid and acid fumes at various points, would be constructed of materials which would withstand corrosion. For example, some of the materials which may be employed in the construction of my apparatus are austenitic stainless steels, high chromium stainless steels, synthetic resins such as phenol-formaldehyde, "Koroseal," "Vinyon," "Bakelite," "Ryertex," as well as such woods as cypress. Also fiberglass and ceramics may be employed. The foregoing materials are obtainable commercially and their composition is described in publications as for example "Koroseal" is discussed in Ellis' publication on resins.

It is likewise to be understood that valves may be inserted at various points in the apparatus or other controlling device for assisting in the carrying out of various processes in the apparatus. For example, it will be observed that in connection with filters 28 and 29, valves may be inserted so that one filter may be cut out of operation, cleaned or repaired while the other filter is in operation. It is to be understood that such features may be employed with respect to temperature control 31 by, for example, placing a plurality of temperature controllers in parallel with other changes incorporated. Figure 1 has been described primarily for generically illustrating the preferred embodiment of my apparatus and is not to be considered as an undue limitation upon my invention.

Referring to Figure 2, there is here disclosed a distillation column 71 which may be of conventional design. That is, the column may be either a packed or plate column. The lower portion of the column is connected with, for example, the jacketed still pot 72. If desired, other methods of indirect heating as, for example, a jacketed coil could be employed. A suitable drawoff 73 is provided so that the contents of the still pot may be drawn off.

The upper portion of the column is connected to a vapor offtake conduit 74 which leads through a condenser or other cooling means 75 to a weirbox 76 or other device for collecting the condensate. A reflux conduit is provided at 77 and a drawoff conduit at 78. Feed to the column is provided by means of conduit 79.

The operation of my apparatus will be understood from the description of the processes set forth hereinafter.

Referring now to the process of separating and recovering acid as, for example, the recovery of waste nitration acids in the manufacture of cellulose nitrate, as already indicated, in prior art practice such large amounts of water have been employed that these waste nitration acids have only been obtained as, for example, very dilute solutions of only 3 percent strength.

In my process I have developed a much more economical method which would, for example, permit obtaining these waste nitration acids in approximately 30 percent strength by weight instead of the aforementioned 3 percent. In general my method consists of employing a countercurrent washing in order to obtain the acids in the state of higher concentration. The cycle in each stage of my process may be considered as comprising (1) introducing and mixing the cellulose nitrate and water in the stage; (2) allowing these materials to approch equilibrium conditions; (3) separating the nitrocellulose from the water by gravity or applied forces; and (4) conveying to the next stage. In performing this process I have found the folowing factors to be of definite importance:

(1) The combined $H_2SO_4$ and $HNO_3$ must not be allowed to exceed 40% by weight in the water. The optimum value is 30%.

(2) The temperature of the water-acid mixture of highest concentration must not exceed 130° F. The optimum figure is 100° F. or less.

(3) The cellulose nitrate must not remain in contact with the water-acid mixture of highest concentration for more than one hour, preferably not more than fifteen minutes.

These three factors determine the amount of denitration which occurs during the countercurrent process.

(4) The ratio of liquid on the cellulose nitrate after step No. 3 in the above cycle to the cellulose nitrate influences the efficiency of the process and should not exceed 7:1 by weight, preferably not exceed 3:1 by weight.

(5) The number of stages employed influences the efficiency of the process. With the proper control of the process a recovery of 90 percent of the waste acid can be obtained in 30 percent concentration by means of only three stages of countercurrent washing. However, it may be more economical in some cases to employ as many as 7 stages.

Thus it is made possible, with little expenditure of energy, to recover the waste acids in sufficient concentration that they can be economically concentrated to usual strengths.

A still further detailed description of the application of my process, employing the apparatus of Figure 1, will be had from the following description which will likewise concern the separation of waste nitration acids from nitrocellulose. Referring now to Figure 1, the nitrocellulose from nitrating centrifuges in accordance with existing practice, probably would contain an amount of acid of approximately the same weight as the cellulose nitrate. It is to be understood that the exact amount of acid mixed with solid from which the acid is to be recovered and separated, is not a limitation upon my invention but has been referred to for more clearly describing my invention in connection with conditions actually encountered commercially. This mixture of nitrocellulose and waste acid is discharged into the feed basin 9 where it is soused with the liquid, conducted through the recirculation line comprised of parts 27, 28, 29, 31, and 32.

The resultant mixture in 9, comprising in the instance of the example under consideration, cellulose nitrate, acid, and water is discharged through conduit 11 onto the screen conveyor 12. The material discharged onto the conveyor is carried from the point of discharge upward on the conveyor toward the rollers 19 and 20. During this trip the liquid will drain through the screen conveyor away from the solid. The material is discharged from the conveyor through the rollers 19 and 20 where further liquid is squeezed from the solid. All of this liquid collects in sump 21.

The solid, which in the example under consideration is cellulose nitrate, falls into unit 2 where it is dispersed into the liquid therein by means of a stirrer 6. A portion of this liquid and nitrocellulose from unit 2 is drawn from conduit 42 and pumped by means of pump 43 to conduit 44 where it is discharged onto screen conveyor 36. As in unit 1 the solid on conveyor 36 becomes separated from the liquid to some extent and is discharged through rollers 38 and 39 where further liquid is squeezed out. The liquid squeezed out remains in unit 2 and the cellulose nitrate is discharged through rollers 38 and 39 into the unit indicated as 3.

In this unit the cellulose nitrate is again mixed with the liquid in the unit, pumped to a point above the conveyor, carried on the conveyor, the liquid separated and cellulose nitrate passed through the rollers into the next succeeding unit. By this manner the cellulose nitrate proceeds from stage to stage until it is finally discharged at 61.

However, in the last unit of the series, which in the example under consideration is unit 4, water is supplied through conduit 51 in such quantity that it overflows through orifice 50 from stage to stage until it finally leaves unit 1 through conduit 22 at the desired strength in acid. By supplying sufficient water through conduit 51 the content of acid in unit 1 will not build up to exceed 40 percent as referred to under (1) above. Likewise by pumping the liquid from unit 1 through filters 28 and 29 any cellulose nitrate fibers are removed and hence, the time of contact with any cellulose nitrate fibers of the strong-acid water in unit 1 is limited. By means of temperature controller 31 the temperature of the strong-acid and water mixture introduced into the vessel 9 may be held below the maximum specified by (2) above. By controlling the speed of the various pumps 26, 43, etc., as well as the quantity of cellulose nitrate fed, and the speed of the various conveyors 12, 36, etc., the period of contact in accordance with (3) of the cellulose nitrate with the water-acid solution can readily be controlled for any period of time desired.

By operating the process as above described, and controlling the quantity of water introduced through conduit 51, an acid of approximately 30 percent strength may be obtained as through conduit 22 and collected in the receiver 23. It, therefore, can be seen that for example in the case of operating on waste nitration acids a common liquid encountered in the industry and mainly a mixture of nitric and sulfuric acids, an aqueous acid liquid may be separated and recovered which in many instances is approximately ten times stronger than the aqueous acid which has heretofore been recovered in comparable processes for the preparation of cellulose nitrate.

While such 30 percent acid may be used for some purposes as obtained, in many instances it may be desired to concentrate the acid further as, for example, to a 95 percent nitric acid. Assuming that the nitric acid is mixed with sulfuric acid as in many instances encountered in industrial operations, it may also be desired to effect a separation of the acids.

Prior to my invention in concentrating nitric acid solutions by distillation, it has been suggested to eliminate the water present with nitric acid by employing a dehydrating agent. Such procedure has been considered required because of the fact that nitric acid forms a maximum boiling mixture with water of the composition 68 percent nitric acid-32 percent water. Hence, it would appear that the dehydration of nitric acid by simple distillation would be impossible beyond a 68 percent concentration.

In prior methods which have been suggested for concentrating nitric acid, to my knowledge no one has appreciated that not only should the admixed dehydrating agent $H_2SO_4$ be introduced at the top of the column but that in some cases it is also beneficial to return a portion of the distillate as a reflux to the top of the column. I have found it possible by this method to obtain continuously a product in nitric acid as rich as, or richer than, the vapor in equilibrium with the feed mixture at its boiling point. The advantages of this operation will be revealed later.

In my process, as I have already indicated, it is immaterial that the nitric acid from the process of Figure 1 contains sulfuric acid.

Referring now to Figure 2 which has already been described and may comprise in its construction a column of conventional design and other conventional parts, the dilute acid, as for example a 30 percent acid of the nature referred to, after a simple rectification process to remove some of the water, would be fed into the distillation column through conduit 79 along with suitable amounts of $H_2SO_4$ at least 80% strength. Heat is applied to the base heater 72 by means of the steam jacket and distillation conducted in standard manner. The vapors which pass through vapor off-take conduit 74 are led through condenser 75 and a nitric acid condensate is caused to collect in the weirbox 76. A portion of this nitric acid condensate is returned to the column through conduit 77 as reflux. The other portion may be drawn off through conduit 78 as a concentrated nitric acid for whatever use is desired. In operation of my process, for example, a column of between 4 and 15 plates could be employed. The proportion of the condensate refluxed would vary between about 20 percent and 80 percent of the condensate at 76.

In the prior art methods for distilling nitric acid, as I have indicated, it has been customary to distill the nitric acid in the presence of concentrated sulfuric acid which retains the water, permitting the nitric acid to be distilled off and condensed directly, no reflux being used.

However, the advantages of my novel method of operation are several. It can be applied to aqueous (dilute or partially concentrated) feed mixtures which are impractical for use in processes commonly used today. For example, it is possible to obtain continuously with good yield 95 percent $HNO_3$ from feed mixtures defined as follows: $H_2O$, 22 percent to 30 percent; $HNO_3$ small percent to 24 percent; and $H_2SO_4$ the balance. For different product strengths, the limits of feed composition are different. A further advantage of this process is that it permits, for example, the production of 95 percent $HNO_3$ continuously with good yield from a mixture such that the $H_2SO_4$ recovered from the bottom of the still will be as low in strength as 70 percent $H_2SO_4$, this being accomplished by means of indirect heating with no introduction of steam directly to the system and with only very slight breakdown of the $HNO_3$. A further advantage is that it is unnecessary to use sulphuric acid of more than 80 percent strength for dehydrating the usual strengths of weak $HNO_3$. This permits operating the $HNO_3$ concentrator at a lower temperature and also permits reconcentrating the $H_2SO_4$ at a lower temperature.

It can be seen from the foregoing, therefore, that I have provided novel procedure and apparatus for permitting the recovery of inorganic acids and in particular nitric acid in either partially concentrated condition such as a 30 percent acid or as a concentrated acid such as a 95 percent acid from solutions which heretofore have either been lost as waste or presented extreme difficulties of concentration by attempting to evaporate, for example, substantially all of the water from a 3 percent acid solution. My process may be operated more or less automatically and substantially continuously. While I have described my invention as applied to acid mixtures of particular concentrations which correspond to concentrations obtained industrially, it has been primarily for the purpose of illustration and it is to be understood that my invention is not to be restricted in this respect. My invention may be applied to various mixtures of inorganic acids containing various amounts of nitric acid and sulfuric acid, either from waste solutions or otherwise, it being kept in mind, as pointed out above, that in the distillation step of Figure 2, the mixture would be brought into certain limits by the addition of 80 percent or higher sulfuric acid to make the feed supplied through conduit 79. It is also apparent from the foregoing that certain changes may be made in my invention as, for example, modifications of the treatment of the 30 percent acid after recovery by the countercurrent process and before final distillation, or use of conventional methods of $HNO_3$ concentration in conjunction with the countercurrent process, or by reusing the 30 percent acid in conjunction with an ammonia oxidation plant as a means of supplying water to the scrubbing towers. Also while I have described the use of my countercurrent treatment and apparatus on nitrates which present special problems of decomposition, my apparatus may be used on other materials. That is cellulose esters or mixed esters may be washed therein. Hence, I do not wish to be restricted excepting insofar as is necessitated by the prior art and the spirit of the appended claims.

I claim:

1. In the manufacture of cellulose nitrate in which cellulose is nitrated and then centrifuged, the steps which comprise immediately sousing the cellulose nitrate, after centrifuging, in a liquid essentially consisting of an aqueous mixture of nitric and sulfuric acids having an acid concentration of 25-40%, and a temperature of below 130°, separating the nitrate therefrom and subsequently continuously passing the nitrate in suspended condition through a series of acid washes of decreasing concentrations approaching as the limit, 0, equilibrium conditions being at least approached in each wash liquid which is employed.

2. In the manufacture of cellulose nitrate in which cellulose is nitrated and then centrifuged, the steps which comprise immediately sousing the cellulose nitrate, after centrifuging, in a liquid having an acid content of 25-40% and a temperature below 130° F., separating out the liquid from the cellulose nitrate and continuously passing the nitrate through a series of acid baths of progressively decreasing concentrations approaching as the limit, 0, equilibrium conditions being at least approached in each wash liquid which is employed.

3. In the manufacture of cellulose nitrate in which cellulose is nitrated and centrifuged, the steps which comprise immediately sousing the cellulose nitrate, after centrifuging, in a liquid having an acid concentration of 25-40% and a temperature below 130° F., and within not more than 15 minutes applying pressure to the cellulose nitrate sufficient to squeeze out the major portion of the acid, and continuously passing it through a series of acid baths of progressively decreasing concentrations approaching as the limit, 0, equilibrium conditions being at least approached in each wash liquid which is employed.

4. In the manufacture of cellulose nitrate in which a cellulose is nitrated and centrifuged, the step which comprises immediately sousing the cellulose nitrate after centrifuging with aqueous sulfuric and nitric acids of 25-40% strength and at a temperature below 130° F., and within less than 15 minutes separating the acid liquid from the cellulose nitrate and washing the cellulose nitrate to substantially remove the acid therefrom.

5. In the manufacture of cellulose nitrate in which cellulose is nitrated and centrifuged, the steps which comprise immediately sousing the cellulose nitrate, after centrifuging, with an aqueous acid liquid having a concentration of 25-40% and a temperature of below 130° F., separating a portion of the acid by screening the mixture, separating further liquid by applying pressure to the solid sufficient to squeeze out acid and then continuously passing the cellulose nitrate through a series of aqueous acid baths of progressively decreasing concentrations approaching as the limit, 0, equilibrium conditions being at least approached in each wash liquid which is employed.

6. In the manufacture of cellulose nitrate in which cellulose is nitrated and centrifuged, the steps which comprise immediately sousing the cellulose nitrate after centrifuging in an aqueous acid liquid having a concentration of 25-40%, and a temperature below 130° F., separating a portion of the acid from the nitrate by screening the mixture, separating a further quantity of acid by applying pressure to the nitrate whereby the acid is removed from the nitrate in less than 15 minutes, then washing the nitrate by continuously passing it through a series of acid baths of progressively decreasing concentrations approaching as the limit, 0, equilibrium between the acid and the nitrate being approached in each bath, pressure having been applied to the cellulose nitrate from each wash bath to squeeze out a substantial portion of the liquid held thereby before introducing into the next succeeding acid bath.

7. In the manufacture of cellulose nitrate in which cellulose is nitrated and then centrifuged, the steps which comprise immediately sousing the cellulose nitrate after centrifuging in acid liquid of approximately 40% strength and separating the solid from the acid liquid within 15 minutes followed by continuously passing the cellulose nitrate through a series of acid baths of decreasing concentrations approaching as the limit, 0, equilibrium between the nitrate and acid bath being attained in each instance, the cellulose nitrate in passing from one bath to the next being subjected to a draining action and then to rolling pressure to eliminate the major portion of the liquid in close association with the cellulose nitrate prior to its introduction into the succeeding acid bath.

WILLIAM E. SILLICK.